United States Patent
Utermoehlen et al.

(10) Patent No.: US 11,293,785 B2
(45) Date of Patent: Apr. 5, 2022

(54) ENCODER WHEEL ASSEMBLY AND METHOD FOR ASCERTAINING AN ABSOLUTE ANGULAR POSITION AND A ROTATIONAL DIRECTION

(71) Applicant: Robert Bosch GmbH, Stuttgart (DE)

(72) Inventors: Fabian Utermoehlen, Lippstadt (DE); Bernd Eckert, Vaihingen an der Enz (DE); Marcel Maur, Asperg (DE); Matthias Letzgus, Rosenberg (DE); Stephan Hanel, Markgroeningen (DE); Tino Merkel, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 16/479,983

(22) PCT Filed: Nov. 20, 2017

(86) PCT No.: PCT/EP2017/079773
§ 371 (c)(1),
(2) Date: Jul. 23, 2019

(87) PCT Pub. No.: WO2018/133978
PCT Pub. Date: Jul. 26, 2018

(65) Prior Publication Data
US 2019/0368902 A1     Dec. 5, 2019

(30) Foreign Application Priority Data

Jan. 23, 2017  (DE) .................... 10 2017 200 988.8

(51) Int. Cl.
*G01D 5/249*     (2006.01)
*G01D 5/14*      (2006.01)

(52) U.S. Cl.
CPC .......... *G01D 5/2497* (2013.01); *G01D 5/142* (2013.01)

(58) Field of Classification Search
CPC ...... G01D 5/142; G01D 5/145; G01D 5/2451; G01D 5/2454; G01D 5/2497;
(Continued)

(56) References Cited

U.S. PATENT DOCUMENTS

2002/0175276 A1* 11/2002 Smith ............... G01D 5/2497
                                                   250/231.13
2003/0062890 A1*  4/2003 Tokumoto ........... G01L 3/104
                                                   324/207.25
(Continued)

FOREIGN PATENT DOCUMENTS

CN       1670484 A     9/2005
CN     101676692 A     3/2010
(Continued)

OTHER PUBLICATIONS

International Search Report for Application No. PCT/EP2017/079773 dated Jan. 31, 2018 (English Translation, 3 pages).

*Primary Examiner* — Steven L Yeninas
(74) *Attorney, Agent, or Firm* — Michael Best & Friedrich LLP (57) ABSTRACT

An encoder wheel assembly comprising: a first encoder wheel rotationally fixed to a rotor and having a number n of teeth arranged along the circumference of the encoder wheel; a second encoder wheel rotationally fixed to the first encoder wheel, and having the same number n of teeth as the first encoder wheel along the circumference of the encoder wheel, wherein the teeth of the second encoder wheel have an asymmetrical angular offset relative to the teeth of the first encoder wheel; a first sensor designed to scan the first encoder wheel; a second sensor designed to scan the second encoder wheel; and a controller connected to the first sensor and the second sensor and designed to ascertain the absolute angular position and the rotational direction based on a (Continued)

binary signal derived from a first signal of the first sensor and a second signal of the second sensor.

15 Claims, 4 Drawing Sheets

(58) Field of Classification Search
CPC ............. G01D 5/24438; G01D 5/2458; G01D 2205/771; G01D 2205/774; G01D 2205/85

See application file for complete search history.

(56) References Cited

U.S. PATENT DOCUMENTS

| | | |
|---|---|---|
| 2004/0003672 A1 | 1/2004 | Rubenstein |
| 2010/0072988 A1* | 3/2010 | Hammerschmidt . G01R 33/093 324/207.25 |
| 2010/0225308 A1* | 9/2010 | Kurumado ........... G01D 5/2451 324/207.25 |
| 2014/0184030 A1* | 7/2014 | Labriola, II ......... G01D 5/2451 310/68 B |
| 2018/0154926 A1* | 6/2018 | Ohira ..................... G01D 5/244 |
| 2018/0356256 A1* | 12/2018 | Mirassou ............. G01D 18/002 |

FOREIGN PATENT DOCUMENTS

| | | |
|---|---|---|
| CN | 104487807 A | 4/2015 |
| DE | 4011503 | 10/1991 |
| DE | 102004063415 | 7/2005 |
| DE | 102013203937 | 9/2014 |
| EP | 0909955 | 4/1999 |
| EP | 1369339 | 12/2003 |
| EP | 1510787 | 3/2005 |

* cited by examiner

ENCODER WHEEL ASSEMBLY AND METHOD FOR ASCERTAINING AN ABSOLUTE ANGULAR POSITION AND A ROTATIONAL DIRECTION

BACKGROUND OF THE INVENTION

The present invention relates to an encoder arrangement and a method for determining an absolute angular position and a rotational direction in particular of an electric machine (electric motor) by means of an asymmetric angular displacement of teeth of two encoder wheels.

Electric machines (electric motors) are the focus of current development for the realization of traction in electric vehicles (EVs). Asynchronous machines or synchronous machines are largely used for realizing traction in EVs. Both kinds of machine comprise a stator with a fixed position and a rotor that turns. The stator usually carries three mutually offset winding phases, wherein these are, in particular, offset by an angle of 120° [degrees]/p, where p represents a number of pole pairs of the machine. In the case of an asynchronous machine (ASM) the rotor consists of electrically conductive bars that are short-circuited at the ends in the manner of a ring. If a rotor field of the rotor now turns, a voltage is induced in these bars which gives rise to a flow of current. The flow of current in turn creates an opposing magnetic field, so that a rotary movement results. Since the induced voltage becomes zero when the rotor field and the stator are turning at the same speed, a rotation speed difference, which is known as slip and which directly affects a torque of the machine, always develops.

In the synchronous machine the rotor consists of a runner that carries an excitation coil. A direct current flows in the excitation coil and generates a static magnetic field. A permanent magnet can also be used as the rotor as an alternative to this. This is then a permanently excited synchronous machine (PSM) which, as a result of zero-power excitation, has a higher efficiency and is accordingly more suitable for traction applications. The rotation speed of the rotor is, in principle, identical to the rotation speed of the exciting field. The torque depends on a phase offset. The phase offset is the angular difference between the stator field and the rotor.

For drive of power electronics and a corresponding provision of the stator coil signals, it is necessary to know the rotation speed of the rotor in the case of the ASM, and the absolute angular position of the rotor in the case of the PSM. For reasons of functional reliability the rotational direction of the rotor must, amongst other things, also be determined in both cases.

A resolver is frequently used in order to determine these parameters. This is an electromagnetic measuring transducer, wherein a rotor package is mounted on a shaft of the machine such that it cannot rotate. An excitation coil and two receiving coils are also mounted on the stator in the form of a surrounding ring. An alternating voltage signal in the range of a few tens of kHz [kilohertz] (preferred frequency 10-80 kHz) is applied to the excitation coil and permeates the entire arrangement with an alternating field. Depending on the absolute angular position, an amplitude-modulated sinusoidal voltage is induced in the first receiving coil, while an amplitude-modulated cosinusoidal voltage is induced in the second receiving coil. The resolver here requires a relatively large amount of installation space, entails complex signal provision and preparation, and must be assembled with very tight mechanical tolerances. Exchange in the event of a fault is, furthermore, only possible with significant difficulty, since almost the entire machine must be dismantled. In addition to electromagnetic resolvers, there are also optical resolvers (e.g. according to DE 10 2013 203937), which, in addition to high costs, have a significant cross-sensitivity to soiling and accordingly cannot be used in every environment.

Inductive absolute angle sensors can, alternatively, be used. Generally speaking, two sensor principles are known: a first sensor principle is based on the eddy current effect. A metal target is moved here over sensor coils that are subjected to an alternating voltage, and an eddy current is induced in the target. This leads to a reduction in the coil inductances and, through a connection in a resonant circuit, allows the angle of rotation to be deduced on the basis of a frequency change. A high cross-sensitivity to mechanical installation tolerances (above all to a tilting of the target), together with the possibility of the frequencies being locked to disturbances from outside (injection locking), since frequencies in the range of a few tens of MHz [megahertz] (preferably 20-50 MHz) are usually used, are disadvantageous here. The other sensor principle is based on coupled coils (e.g. in accordance with EP 0 909 955 B1). This type of sensor is characterized in that an alternating electromagnetic field is generated in a single excitation coil, and is coupled into a plurality of receiving coils in each of which a voltage is induced. A rotatably mounted, conductive target is required for the measurement of the absolute angular position; said target affects an inductive coupling between the excitation coil and the receiving coils depending on its angular position (relative to the coils). A circuit complexity for the provision of signals, and an absence of real-time capability of a signal processing, are disadvantageous here. Known digital interfaces (e.g. SENT) are too slow to supply angle information sufficiently often, particularly at high rotation speeds.

Phase encoders and rotation speed encoders (e.g. according to DE 4011503 AI) are known for the measurement of rotation speed and absolute angular position measurement derived from that in combustion engines (VKM). The sensors here can be Hall elements, for example, that are mounted on a back-bias magnet. If a toothed, ferromagnetic wheel (target) rotates past the Hall elements, this leads to a change in the Hall voltage since a magnetic circuit changes. A Hall signal is advantageously converted by a comparator circuit or a Schmitt trigger into a digital signal which can, for example, initiate the ignition of the VKM in real time. In order to be able to measure absolute angular positions with sensors of this type, three sensors, which are arranged with 120° of electrical offset with respect to one another, are usually used. In addition to high sensor costs, this entails a complex assembly which, for reasons of space, cannot always be realized.

SUMMARY OF THE INVENTION

A method for the provision of an absolute angular position and a rotational direction of rotor with digital output signals and a corresponding encoder arrangement are described here. A method, an encoder arrangement, a computer program and a storage medium, are proposed for this purpose. Further advantageous forms of embodiment of the method and of the encoder arrangement are objects of the respective subsidiary claims. The individual features described in the claims can be combined with one another in any desired, technologically appropriate manner, and can be supplemented by explanatory content from the following description without thereby leaving the scope of the disclosure.

An encoder arrangement for determining an absolute angular position and a rotational direction of a rotor is described here in particular. The encoder arrangement comprises a first encoder wheel that is fastened to the rotor in a non-rotating manner. The first encoder wheel here comprises a number n of equally spaced teeth arranged along its circumference. The encoder arrangement further comprises a second encoder wheel that is connected non-rotatably to the first encoder wheel. The second encoder wheel here comprises the same number n of teeth as the first encoder wheel along its circumference. The teeth of the second encoder wheel here have an asymmetric angular offset with respect to the teeth of the first encoder wheel. The encoder arrangement further comprises a first sensor that is designed for sensing the first encoder wheel, and a second sensor that is designed for sensing the second encoder wheel. The encoder arrangement also comprises a controller that is connected to the first sensor and to the second sensor for communication. The controller is here designed for a determination of the absolute angular position and for a determination of the rotational direction on the basis of a binary signal. The binary signal is derived here from a first signal of the first sensor and a second signal of the second sensor.

The encoder arrangement is in particular suitable for determining the absolute angular position and rotational direction of a rotor of an electric machine (electric motor).

The first encoder wheel and the second encoder wheel rotate at the same angular speed as the rotor. The encoder wheels can preferably have the same axial dimensions (width B) and the same diameter D. The diameter D can preferably lie in the range between a few tens of millimeters up to several hundred millimeters, and particularly preferably between about 50 mm [millimeters] up to 350 mm. The width B of each single encoder wheel can preferably lie between about 5 mm and 20 mm, and particularly preferably be 8 mm.

In contrast to the regularly arranged teeth of the first encoder wheel, the teeth of the second encoder wheel each have an asymmetric angular offset V from the teeth of the first encoder wheel. The angular offset V of each tooth of the second encoder wheel with respect to the respective corresponding tooth of the first encoder wheel is either positive or negative. In addition, each angular offset V can preferably have the same magnitude. An angular offset V between the teeth on the first encoder wheel and the corresponding teeth on the second encoder wheel can be constant in magnitude, and preferably have a magnitude between 20% [percent] and 50%, and particularly preferably a magnitude of 30% of a length L of the teeth. Each tooth of the second encoder wheel thus lies with either a positive offset in front of the corresponding tooth of the first encoder wheel or with a negative offset behind the corresponding tooth of the first encoder wheel. The angular offsets of all the tooth-pairs of the teeth of the first encoder wheel with the corresponding teeth of the second encoder wheel yield a series of offsets, and thereby an encoding. The teeth can here be projections with depressions lying between them, but can also be other markings (colors, dopings (magnetic, radioactive, . . . ), etc.) that permit a distinction between tooth and gap. The number n of teeth (and gaps) should in principle be maximized in order to ensure a high angular position resolution of the encoder arrangement. Preferably the number of teeth n can be ≥8p, where p is the number of pole-pairs of the electric machine, in order to enable a robust and sufficiently accurate commutation. A length L of a tooth and a length S of a gap are therefore subject to a lower limit, since the (magnetic) contrast (e.g. Hall voltage difference in the case of Hall sensors) must be sufficiently large as a tooth or a gap passes by. Preferably a length S of a gap of the first encoder wheel can be approximately 10% larger than the length L of a tooth, and, further preferably, be between about 2 mm to 5 mm, particularly preferably 3.5 mm. The height H of a tooth is not subject to an upper limit, and only has to be sufficient for a tooth to be distinguishable from a gap.

The first sensor and the second sensor must be able to distinguish the teeth on the encoder wheels from gaps in between them. Magnetic field sensors, giant magnetoresistance (GMR) sensors, tunnel magnetoresistance (TMR) sensors, inductive, passive sensors (coil with permanent magnet) or the like can in particular be used in combination with magnetic teeth as sensors. Optical sensors or ultrasonic sensors that can detect the teeth and gaps (e.g. by means of height differences) on an encoder wheel are, however, also suitable as sensors here. The first signal of the first sensor and the second signal of the second sensor can preferably each be converted into a digital signal through analog/digital conversion. Advantageously the first signal and the second signal can be converted respectively into a digital signal through a comparator circuit or a Schmitt trigger. The conversion into a digital signal can take place in the first and second sensors or in the controller.

The controller is connected communicatively to the sensors, and processes their signals in order to determine the absolute angular position and the rotational direction from them. The controller can be an integrated circuit. An integrated circuit can be a microcontroller (μC) or an application-specific integrated circuit (ASIC) or an application-specific standard product (ASSP) or a field-programmable gate array (FPGA) or the like. An integrated circuit can comprise a volatile or non-volatile memory. The volatile memory can be a memory with random/immediate access (random access memory, RAM). The non-volatile memory can be a secondary memory such as, for example, a hard disk, a CD, a DVD, a floppy disk or a semiconductor memory (e.g. EPROM, flash memory, or the like). The controller can, furthermore, be integrated into a control device of the electric machine.

The absolute angular position and the rotational direction of the rotor can be determined through measuring the angular offset of two respective teeth that are located on two different encoding wheels of the encoder arrangement. The angular offset of a pair of teeth is realized through a relative angular displacement along the respective circumference of the encoding wheels, and serves to generate a binary value (logical 0 or logical 1). The rotational direction and the absolute angular position can be determined through pattern recognition with the aid of a special encoding based on the asymmetric (alternating positive and negative) angular displacement. The corresponding encoder arrangement is so designed here that it is possible to recognize within a first electrical rotation whether a torque is being output in an incorrect rotational direction. The absolute angular position can also be recognized through the encoding of an encoder wheel structure with subsequent evaluation of the signals of the two sensors. For this purpose the controller receives the first signal of the first sensor that recognizes the teeth of the first encoder wheel, and the second signal of the second sensor that recognizes the teeth of the second encoder wheel. The binary signal is derived from the first signal and the second signal. The derivation of the binary signal can preferably take place through forming the difference between the first signal and the second signal, based on the respectively positive or negative angular offset of the teeth of the second encoder wheel from the corresponding teeth of the first encoder wheel. The binary signal can correspond to a logical 1 when a tooth of the second encoder wheel is detected before a corresponding tooth of the first encoder wheel, and a logical 0 when a tooth of the second encoder wheel is detected after a corresponding tooth of the first encoder wheel, or vice versa. The binary signal can be derived directly by the controller through a measurement of the phase of the two signals of the sensors. A binary value which is determined by means of the two signals of the sensors therefore results for each pair of teeth consisting of one tooth of the first encoder wheel and a corresponding tooth of the second encoder wheel on the basis of their angular offset. After one electrical rotation an asymmetric sequence that echoes the asymmetric encoding, which corresponds to the asymmetric angular offset of the teeth of the second encoder wheel with respect to the teeth of the first encoder wheel, thus emerges from the binary signal. In order to be able to recognize the absolute angular position and the rotational direction from the binary signal unambiguously, there must be a special encoding, and therefore a special arrangement of the teeth of the second encoder wheel. An asymmetric angular offset of the teeth of the second encoder wheel with respect to the teeth of the first encoder wheel must be present, so that a clockwise rotational direction can be distinguished from an anticlockwise rotation. For this purpose it must be possible for a binary sequence of the binary signal that results from one electrical rotation to be associated unambiguously with a clockwise or anticlockwise rotation. This is possible with the following asymmetric arrangement of the individual angular offsets V:

a) If the number n of teeth is odd, any arrangement of angular offsets V that does not lead to encodings with exclusively identical numbers (i.e. not exclusively positive or negative angular offsets V) is permissible. Neither 00000 nor 11111 are, for example, permissible for a five-figure encoding.

b) If the number n of teeth is even, any arrangement of angular offsets V that does not result in encodings that can be converted into symmetric encodings through a bit shift (to the left or the right) is permissible. The encoding 00001111, for example, can be converted into 11000011 through a shift of two bit positions to the right, so that it is not possible to distinguish a clockwise rotational direction from an anticlockwise rotational direction.

When determining the absolute angular position, a starting angle is first determined from the first electrical rotation by means of the asymmetric angular offset and the resulting encoding (pattern recognition). The current absolute angular position can then be determined continuously through the summation of incremental angles that are derived from the binary signal and are added to the starting angle or to the preceding absolute angular position. The smallest possible incremental angle that can be determined with the encoder arrangement depends here on the number n of the teeth on the encoder wheels (e.g. with n=8 the incremental angle is 45° (360°/8)). As soon as the binary signal adopts the next value (logical 0 or 1), the incremental angle is added, and the current absolute angular position is output. In the determination of the rotational direction, an analysis of the binary signal (pattern recognition) is performed during one electrical rotation, similarly to the determination of the starting angle, on the basis of the encoding through the asymmetric angular offset, from which the rotational direction can be unambiguously derived.

High rotation speeds are possible since the sensors used supply digital incremental signals. No complex signal provision and postprocessing is, furthermore, necessary. The measuring principle described furthermore allows for greater permissible mechanical tolerances to the sensor assembly, since the measuring method is very robust. A particularly simple sensor construction is furthermore possible, since the two sensors can be placed in one housing. This leads to a reduction in the costs involved with assembly and repairs, since the sensor can be located radially with respect to a shaft. The encoder wheel geometry in particular permits an integral position determination in accordance with A-SIL D (ISO 26262), since all errors (e.g. missing tooth) can be recognized within an error latency time.

In a further form of embodiment, the teeth of the first encoder wheel and/or the teeth of the second encoder wheel have the same shape.

The teeth of the first and the second encoder wheels have the same geometrical dimensions. A length L of the teeth of the first encoder wheel and of the second encoder wheel can preferably be approximately 2 mm to 5 mm, particularly preferably 3.2 mm. The height H of the teeth does not have an upper limit, but can nevertheless preferably be between about 2 mm to 5 mm, particularly preferably 3.2 mm.

The signal evaluation is significantly simplified through the use of teeth with the same dimensions, since the individual signal blocks always have an almost constant length.

In a further form of embodiment, the first sensor and the second sensor each comprise at least two sensor elements. The first signal and the second signal are here each difference signals of measurement signals of the at least two sensor elements of the corresponding sensor.

A difference signal of two measurement signals from two corresponding sensor elements of a sensor exhibits a logical 1 when the difference between the measurement signals falls below a prescribed lower limit value, and a logical 0 when the difference between the measurement signals exceeds a prescribed upper limit value, or vice versa. From the analog measurement signals of the individual sensor elements, a digital difference signal of the individual sensors is thus directly supplied to the controller.

Through the formation of the difference signal on the basis of limit values, a digital signal is directly present without prior analog/digital conversion. In addition, signal noise can be kept out of the signal that is supplied to the controller with little effort.

In a further form of embodiment, the first sensor and the second sensor are designed to each generate at least two first signals and at least two second signals.

Two signals are supplied to the controller from each of the two sensors. Each sensor here senses the associated encoder wheel at at least two places, and recognizes the teeth. The at least two resulting measurement signals are supplied to the controller, and first converted from analog to digital either in the respective sensor or in the controller. A sensor particularly preferably comprises respectively at least three sensor elements, from whose measurement signals at least two difference signals, as described above, are formed, wherein these at least two difference signals are passed to the controller as the signals of the respective sensor. Redundant information of the sensors is in particular present if as preferred at least three sensor elements per sensor are used and at least two difference signals are determined from the measurement signals. An additional plausibility check through a phase measurement of respectively corresponding associated difference signals of the first and second sensors is then possible.

An increase in the robustness is achieved through the provision of at least two signals per sensor, since in this way redundant information with additional possible plausibility checking is present.

In a further form of embodiment, the controller is designed for a determination of the rotational direction on the basis of the at least two first signals or of the at least two second signals.

One of the at least two signals of a sensor lags the other signal of the sensor. This lag is expressed in a phase shift. The rotational direction of the rotor can be determined from the phase shift with only one of the two sensors. The signal of a sensor that originates from one sensor element or one sensor element arrangement (difference signal) that lies further forward in the rotational direction leads a signal of the sensor that originates from a sensor element or a sensor element arrangement (difference signal) that lies further back in the rotational direction. The rotational direction of the rotor can thus be deduced from the phase shift between the signals of a sensor without the signals of the other sensor also having to be considered.

Redundant information relating to the rotational direction is present due to the at least two signals of a sensor, so that a plausibility check can be carried out, which increases the robustness.

In a further form of embodiment the first sensor and/or the second sensor is a magnetic field sensor, in particular a Hall sensor. Accordingly furthermore, the teeth of the first encoder wheel or the teeth of the second encoder wheel are ferromagnetic.

If a ferromagnetic tooth passes close by a magnetic field sensor or Hall sensor, or by its magnetic field sensor element(s) or Hall element(s), an induction voltage or Hall voltage results due to the change in the magnetic flux as compared with the gaps. This is also true if the gaps are also ferromagnetic but pass by the magnetic field sensor/Hall sensor at a greater distance than the teeth (height difference).

In combination with ferromagnetic teeth, magnetic field sensors and, in particular, Hall sensors, offer a way of recognizing the teeth of an encoder wheel that is particularly accurate, robust, and nevertheless economical.

In vehicles in particular, the absolute angular position and the rotational direction of a rotor of a machine such as an electric machine (electric motor) or VKM can be determined with the encoder arrangement described above.

The method described is a method for determining an absolute angular position and a rotational direction of a rotor. The method comprises the following steps:
a) receiving a first signal from a first sensor that senses a first encoder wheel that is connected non-rotatably to the rotor, wherein the first encoder wheel comprises a number n of evenly spaced teeth arranged along its circumference;
b) receiving a second signal from a second sensor that senses a second encoder wheel of the encoder arrangement that is connected non-rotatably to the first encoder wheel, wherein the second encoder wheel comprises the same number n of teeth as the first encoder wheel along its circumference, wherein the teeth of the second encoder wheel have an asymmetric angular offset to the teeth of the first encoder wheel;
c) deriving a binary signal from the first signal and the second signal;
d) determining the absolute angular position on the basis of the binary signal; and
e) determining the rotational direction on the basis of the binary signal.

The method is in particular suitable for determining the absolute angular position and rotational direction of a rotor of an electric machine (electric motor).

The method is furthermore in particular applicable to an encoder arrangement as described above.

The present method essentially implements the functionality of the controller of the encoder arrangement already described above, so that in principle the same technical means can be employed and the same advantages can be achieved.

The first signal provides the temporal sequence of the teeth, evenly distributed at the first encoder wheel, as the rotor rotates. The second signal provides the temporal sequence of the teeth at the second encoder wheel with an asymmetric angular offset with respect to the teeth of the first encoder wheel. The binary signal is derived, preferably through difference formation, from the first and the second signals, outputting a logical 1 when a tooth of the second encoder wheel is arranged in the circumferential direction before the corresponding tooth of the first encoder wheel, i.e. has a positive offset, and a logical 0 when a tooth of the second encoder wheel is arranged in the circumferential direction after the corresponding tooth of the first encoder wheel, i.e. has a negative offset, or vice versa. In the course of an electrical rotation, an asymmetric sequence which reflects an asymmetric encoding that corresponds to the asymmetric angular offset of the teeth of the second encoder wheel with respect to the teeth of the first encoder wheel is given by the binary signal. The encoding is here asymmetric in such a way that for every starting angle, the absolute angular position and the rotational direction can be unambiguously determined from the binary signal through pattern recognition after one electrical rotation. At the beginning of the rotation, a starting angle can be determined from the first asymmetric sequence that supplies the binary signal derived from the first signal and from the second signal for the instantaneous absolute angular position through pattern recognition after the first electrical rotation of the rotor. An incremental angle with respect to the starting angle or to the respective previous absolute angular position can then be added continuously in order to determine the current absolute angular position. The smallest possible incremental angle that can be determined with the method depends here on the number n of the teeth on the encoder wheels (e.g. with n=8 the incremental angle is 45°). As soon as the binary signal adopts the next value (logical 0 or 1), the incremental angle is added, and the current absolute angular position is output. The rotational direction can be determined directly from the asymmetric sequence through pattern recognition after one electrical rotation.

High speeds of rotation are possible through the processing of incremental signals, while no complex signal provision and postprocessing are required, so that an economical and nevertheless robust and precise method with low difficulty is made available.

In a further form of embodiment, the first signal and the second signal are each difference signals of measurement signals of at least two sensor elements of the corresponding sensor.

A difference signal of two measurement signals from two corresponding sensor elements of a sensor exhibits a logical 1 when the difference between the measurement signals falls below a prescribed lower limit value, and a logical 0 when the difference between the measurement signals exceeds a prescribed upper limit value, or vice versa. From the analog measurement signals of the individual sensor elements, a digital difference signal of the individual sensors is thus directly supplied to the controller.

Through the formation of the difference signal on the basis of limit values, a digital signal is directly present without prior analog/digital conversion. In addition, signal noise can be kept out of the signal that is supplied to the controller with little effort.

In a further form of embodiment at least two first signals and at least two second signals are accordingly received in step a) and step b).

Two respective signals for each of the two encoder wheels are supplied to the controller. Each sensor here senses the associated encoder wheel at at least two places, and recognizes the teeth. The at least two resulting measurement signals are supplied to the controller, and first converted from analog to digital either in the respective sensor or in the controller. Particularly preferably, at least two difference signals, as described above, are transferred to the controller for each encoder wheel, wherein these at least two difference signals are passed to the controller as the signals of the respective sensor. Redundant information about the encoder wheels is in particular present when, as preferred, at least two difference signals are determined from the measurement signals. An additional plausibility check through a phase measurement of respectively corresponding associated difference signals for the first and second encoder wheels is then possible.

An increase in the robustness is achieved through the provision of at least two signals or difference signals per encoder wheel, since in this way redundant information with additional possible plausibility checking is present.

In a further form of embodiment, the rotational direction is determined in step e) on the basis of the at least two first signals or of the at least two second signals.

One of the at least two signals lags the other signal. This lag is expressed in a phase shift. The rotational direction of the rotor can be determined from the phase shift with only one of the two encoder wheels. The signal of an encoder wheel that originates from one sensor element or one sensor element arrangement (difference signal) that lies further forward in the rotational direction leads a signal of the encoder wheel that originates from a sensor element or a sensor element arrangement (difference signal) that lies further back in the rotational direction.

The rotational direction of the rotor can thus be deduced from the phase shift between the signals of an encoder wheel without the signals of the other encoder wheel having to be considered.

Due to the at least two signals, redundant information relating to the rotational direction is present from the first encoder wheel and from the second encoder wheel, so that a plausibility check can be carried out, which increases the robustness.

In a further form of embodiment, a starting angle is established in step d) on the basis of a test pulse method or a current pulse method.

If it is necessary that an initial absolute angular position is known at the very beginning of the rotation of the rotor, use can be made of the known test pulse method or current pulse method. Phases of an electric machine are subjected here to small test currents, and coil impedances are measured. The rotor position (particularly in the case of a PSM) can then be deduced from this.

A computer program that is designed to execute the method described above, and a machine-readable storage medium on which the previously described computer program is stored, should also be described here.

BRIEF DESCRIPTION OF THE DRAWINGS

The method and the encoder arrangement are explained in more detail below, together with the technical environment, by way of example with reference to the figures. It is to be noted that the figures show particularly preferred forms of embodiment of the invention but that the method and the encoder arrangement are nevertheless not thereby restricted. Here.

DETAILED DESCRIPTION

Figure 1:
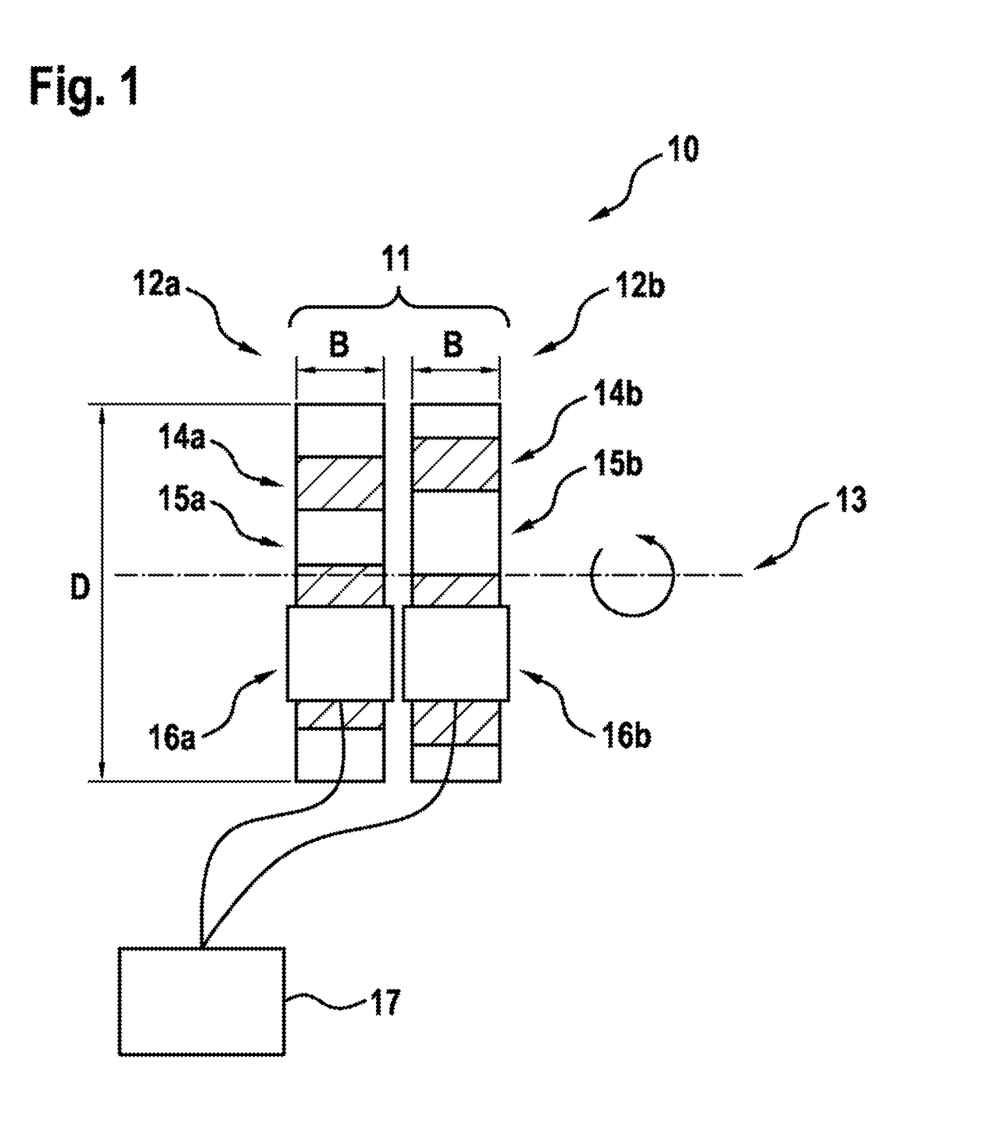
FIG. 1: shows a schematic illustration of an encoder arrangement for determining an absolute angular position and a rotational direction of a rotor.

FIG. 1 shows schematically an encoder arrangement 10 comprising a double-track encoder wheel 11 that comprises a first encoder wheel 12a and a second encoder wheel 12b. The encoder wheels 12a, 12b are mounted such that they can rotate about an axis 13. The axis 13 penetrates the double-track encoder wheel 11, preferably through its center of gravity, and advantageously coincides with an axis of rotation of an electric machine (not illustrated). The encoder wheels 12a, 12b each comprise teeth 14a or 14b and gaps 15a or 15b respectively. The teeth are made of a ferromagnetic material. The encoder wheels 12a, 12b have the same axial dimensions (width B), and have the same diameter D. The teeth 14a, 14b and gaps 15a, 15b of the encoder wheels 12a, 12b are respectively captured with a first Hall sensor 16a for the first encoder wheel 12a and a second Hall sensor 16 b for the second encoder wheel 12b. The Hall sensors 16a, 16b are connected to a controller 17 that is implemented as an integrated circuit.

Figure 2A:
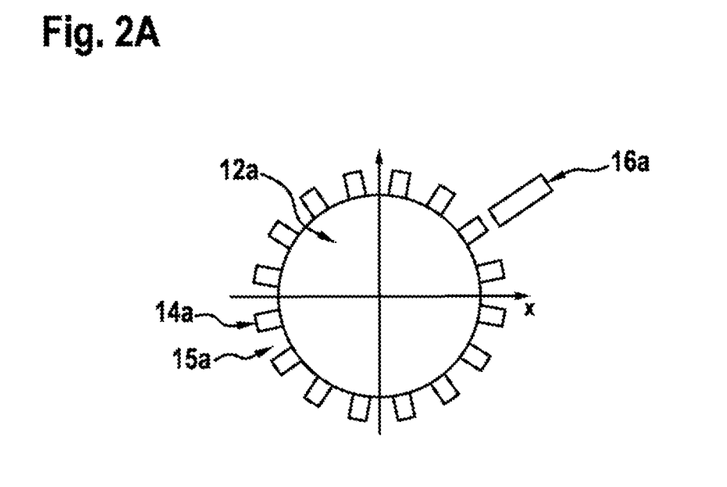
FIGS. 2A and 2B: show a schematic illustration of a first encoder wheel and a first sensor.

FIG. 2A schematically illustrates the first encoder wheel 12a with the teeth 14a and the gaps 15a. The teeth 14a are arranged equidistantly along a circumference of the first encoder wheel 12a. The first hall sensor 16a is arranged at a certain distance from the first encoder wheel 12a, so that it can distinguish the passing teeth 14a from the gaps 15a. The second Hall sensor 16b is in the same way arranged at the second encoder wheel 12b, although the teeth 14b are not arranged equidistantly along a circumference of the second encoder wheel 12b (not illustrated in FIG. 2A). The first Hall sensor 16a supplies a first signal to the controller 17 as it senses the first encoder wheel 12a, and the second Hall sensor 16b supplies a second signal to the controller 17 as it senses the second encoder wheel 12b.

Figure 2B:
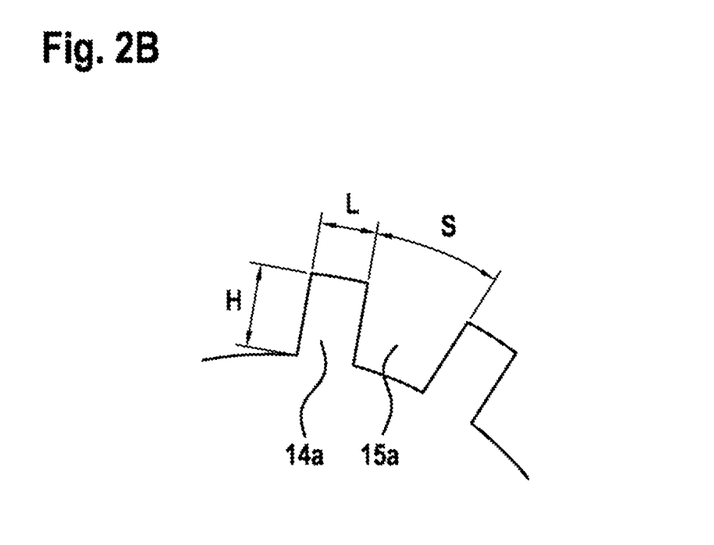

FIG. 2B schematically illustrates two teeth 14a and a gap 15a. The teeth 14a all have an equal length L and an equal height H. Since the teeth 14a are arranged equidistantly along the circumference of the first encoder wheel 12a, the gaps 15a all have an equal length S. The length S of the gaps 15a is about 10% greater than the length L of the teeth 14a, and is 3.5 mm. The height H of the teeth 14a is at least 3.5 mm, but does not have an upper limit. Since the teeth 14b are not arranged with even spacing along the circumference of the second encoder wheel 12b, while the teeth 14b have the same length L and the same height H as the teeth 14a, the gaps 15b however do not have an equal length (not illustrated in FIG. 2B). It is ensured through a consistent geometry of the teeth and an adequate height difference between the teeth and the gaps that the Hall sensors 16a, 16b can reliably distinguish the teeth from the gaps, and that each tooth generates an accurately defined measurement signal.

Figure 3:
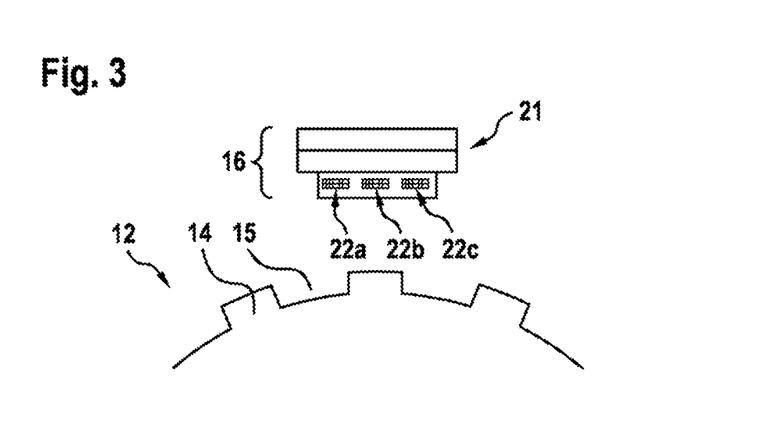
FIG. 3: shows a schematic illustration of a Hall sensor and an encoder wheel.

FIG. 4 schematically shows a Hall sensor 16 of the first encoder wheel 12a or of the second encoder wheel 12b. The Hall sensor 16 comprises a permanent magnet (back-bias magnet) 21 and three Hall elements 22a-22c. A magnetic north pole and a magnetic south pole of the magnet 21 extend essentially tangentially along a plane whose normal vector is perpendicular to the axis 13 (not illustrated in FIG. 3). The Hall elements 22a-22c are arranged at an equal radial distance away from the axis 13 between the permanent magnets 21 and the first encoder wheel 12a, or the second encoder wheel 12b, as well as at an equal spacing behind one another in a tangential direction along the circumference of the first encoder wheel 12a or the second encoder wheel 12b. The Hall elements furthermore each comprise lateral extensions in the range of a few mm. Preferably a width between a front edge of the Hall element 22a and a rear edge of the Hall element 22c is between 1 mm and 2 mm greater than the length L of a tooth, and is particularly preferably between 4 mm and 8 mm.

Figure 4A:
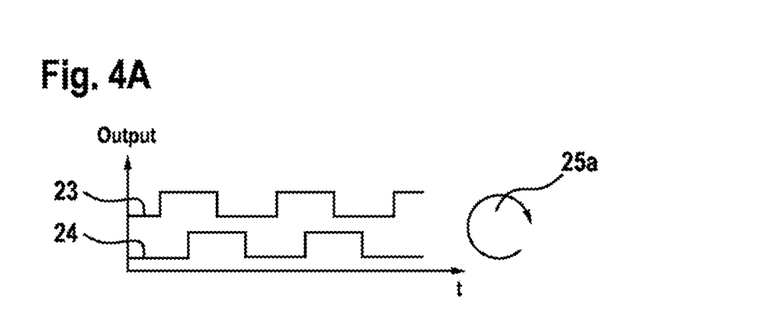
FIGS. 4A and 4B: show an exemplary illustration of signal profiles with opposed directions of rotation.
Figure 4B:
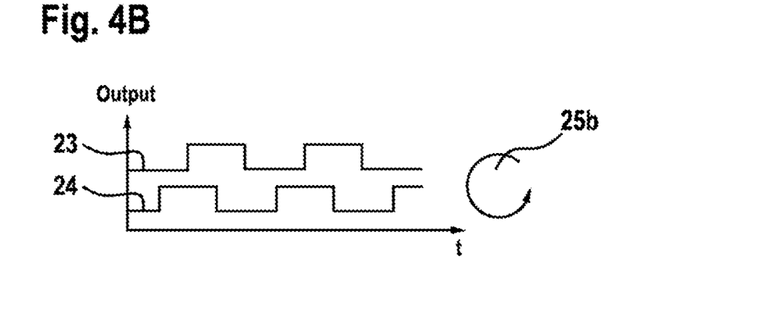

FIGS. 4A and 4B each show a signal profile of a Hall sensor 16 as an encoder wheel 12 turns. A first difference signal 23 between the Hall voltages of the Hall elements 22a and 22b is output into a first channel, and a second difference signal 24 between Hall voltages of the Hall elements 22b and 22c is output into a second channel. If the respective difference between the Hall voltages exceeds an upper limit value, a logical 0 is output by a circuit (e.g. ASIC), not illustrated, integrated into the Hall sensor 16. If the difference between the Hall voltages falls below a lower limit value, the corresponding difference signal 23, 24 changes to a logical 1. Due to the geometry of the encoder wheels 12a, 12b, the difference signals 23, 24 have an electrical phase offset of 90°, and allow the rotational direction to be detected. Other phase offsets can also occur. A clockwise rotational direction 25a is illustrated in FIG. 4A. One of the teeth 14 here first passes the front Hall element 22a. The central Hall element 22b is next passed by the tooth 14. As soon as the tooth 14 is detected by the Hall elements 22a and 22b, the first difference signal 23 outputs a logical 1, since the difference between the Hall voltage of the front Hall element 22a and of the middle Hall element 22b is lower than the lower threshold value. The second difference signal 24 here continues to output a logical 0, since the difference between the Hall voltages of the middle Hall element 22b and of the rear Hall element 22c is above the upper threshold value. As soon as the tooth 14 also passes the rear Hall element 22c the second difference signal 24 outputs a logical 1. The first difference signal 23 leads the second difference signal 24 when the rotation is clockwise. An anticlockwise rotational direction 25b is illustrated in FIG. 4B. In this case, the rear Hall element 22c is passed by one of the teeth 14 first, followed by the middle Hall element 22b and finally the front Hall element 22a. The second difference signal 24 therefore first outputs a logical 1, and the first difference signal 23 follows the second difference signal 24 after a phase offset.

Figure 5:
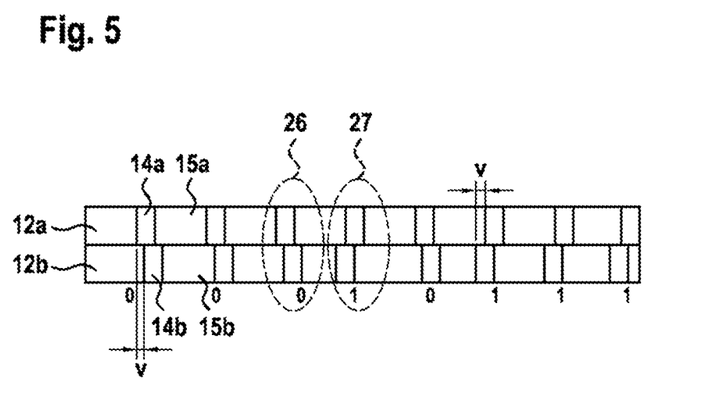
FIG. 5: shows a schematically rolled-out plan view of a first encoder wheel and a second encoder wheel.

The encoder arrangement 10 comprises the double-track encoder wheel 11 with the first encoder wheel 12a and the second encoder wheel 12b in combination with the first Hall sensor 16a and the second Hall sensor 16b in order to be able to determine the absolute angular position after one electrical rotation. The first encoder wheel 12a has a regular arrangement of the teeth 14a for this purpose. This means that the length L of the teeth 14a and the length of the gaps 15a are identical for all teeth 14a and gaps 15a. The second encoder wheel 12b has a number n of teeth 14b equal to the teeth 14a of the first encoder wheel 12a. The teeth 14b on the second encoder wheel 12b are, however, arranged offset in a direction which is positive or negative with respect to an arbitrarily chosen rotational direction compared with the teeth 14a on the first encoder wheel 12a. A corresponding, developed plan view of encoder wheel tracks of an electrical rotation of the encoder wheels 12a, 12b, is shown in FIG. 5. An angular offset V between two teeth 12a, 12b on the first encoder wheel 12a and the second encoder wheel 12b has a size which is a constant 35% of the length L of the teeth 14a, 14b. The arithmetic sign of the angular offset V between the teeth 14a, 14b however differs.

A first and a second binary signal are accordingly generated from respectively the first difference signal 23 and respectively the second difference signal 24 of the first Hall sensor 12a and the second Hall sensor 12b. In the binary signals, a logical 1 corresponds to the moment when one of the teeth 14b of the second encoder wheel 12b is detected in front of the corresponding tooth 14a of the first encoder wheel 12a. Conversely, a logical 0 of the binary signals corresponds to the moment when one of the teeth 14b is detected in front of the corresponding tooth 14a. The binary signals are determined directly by the controller 17 through a measurement of the phase of the two difference signals 23, 24.

For each pair of teeth, consisting of one of the teeth 14a of the first encoder wheel 12a and the corresponding tooth 14b of the second encoder wheel 12b, a binary value is determined as a binary signal with reference to the two difference signals 23 or 24 of the Hall sensors 16a, 16b on the basis of their angular offset V. In order to be able to determine the absolute angular position and the rotational direction from one of the two binary signals, a special arrangement (encoding) of the teeth 14a, 14b with respect to one another is present. This arrangement is an asymmetric angular offset in the sense that a clockwise rotational direction 25a can be distinguished from a backwards, anticlockwise rotation 25b. With eight teeth for each electrical rotation, the asymmetric offset of the teeth 14b with respect to the teeth 14a illustrated in FIG. 5 is present. In the case of an anticlockwise rotational direction 25b the (8-bit) sequence 00010111 results, for example, as the binary signal after one electrical rotation. If a rotational direction 25a is clockwise, the (8-bit) sequence after one electrical rotation is 11101000. It is thus possible to determine unambiguously the rotational direction as well as the absolute angular position. If an initial position of the double-track encoder wheel 11 is different, the (8-bit) sequence changes, yet the (8-bit) sequences for a clockwise rotational direction 25a can always be unambiguously distinguished from the (8-bit) sequences of an anticlockwise rotational direction 25b. The following (8-bit) sequences result if the asymmetric offset of the teeth 14a, 14b to one another is as illustrated in FIG. 5:

| Initial position | Rotational direction 25b (anticlockwise) | Rotational direction 25a (clockwise) |
|---|---|---|
| 0° | 00010111 | 11101000 |
| 45° | 00101110 | 11010001 |

-continued

| Initial position | Rotational direction 25b (anticlockwise) | Rotational direction 25a (clockwise) |
|---|---|---|
| 90° | 01011100 | 10100011 |
| 135° | 10111000 | 01000111 |
| 180° | 01110001 | 10001110 |
| 225° | 11100010 | 00011101 |
| 270° | 11000101 | 00111010 |
| 315° | 10001011 | 00111010 |

Using a double-track encoder wheel 11 with n=8 teeth per encoder wheel 12a, 12b the absolute angular position of the rotor can be determined to within the precision of 45°. A starting angle is determined for this purpose from the first (8-bit) sequence that reflects the asymmetric encoding or the asymmetric angular offset of the teeth 14b from the corresponding teeth 14a, and an incremental angle of 45° is continuously added to this starting angle as soon as the binary signal indicates the next value (logical 0 or 1).

So that an initial absolute angular position can be determined at the very beginning of a rotation of the rotor, use is be made of the known test pulse method or current pulse method. Phases of the electric machine are subjected here to small test currents, and coil impedances are measured. The initial absolute angular position (particularly in the case of a PSM) can then be deduced from this.

Redundant information is available as a result of the two difference signals 23, 24. An additional plausibility check of the absolute angular position determined through a measurement of the phases of respectively associated first difference signals 23 and second difference signals 24 is therefore possible.

Figure 6:
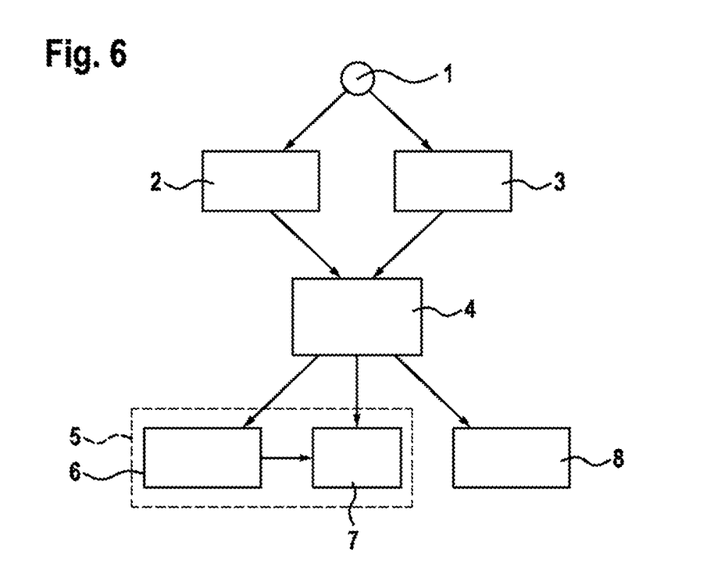
FIG. 6: shows a schematic flow diagram of a method for determining an absolute angular position and a rotational direction of a rotor.

FIG. 6 shows a flow diagram of a method for determining an absolute angular position and a rotational direction of a rotor. Following an optional initialization process 1, a first signal from the first sensor 16a is continuously received in a first reception process 2 and a second signal from the second sensor 16b is received in a second reception process 3. The binary signal is continuously derived in a derivation process 4 from the first and second signals, each of which can be one or a plurality of difference signals 23, 24. The current absolute angular position is then continuously determined in a determination process 5 of the absolute angular position on the basis of the binary signal. The starting angle is determined here in a determination process 6 after the first electrical rotation from the binary signal through pattern recognition, after which, in an addition process 7, the incremental angle is continuously added to the starting angle or to the previous absolute angular position for each new value of the binary signal. The starting angle can alternatively be determined through a test pulse method or a current pulse method in the determination process 6. In a determination process 8 the rotational direction is additionally determined after one electrical rotation from the binary signal or, alternatively, from the two difference signals 23, 24 of the first sensor 12a or of the second sensor 12b.

The invention claimed is:

1. An encoder for determining an absolute angular position and a rotational direction of a rotor, comprising:
    a first encoder wheel connected to the rotor so as to rotate with the rotor, wherein the first encoder wheel comprises a number n of evenly spaced teeth arranged along its circumference;
    a second encoder wheel connected to the first encoder wheel so as to rotate with the first encoder wheel, wherein the second encoder wheel comprises the same number n of teeth as the first encoder wheel along its circumference, wherein the teeth of the second encoder wheel have an asymmetric angular offset to the teeth of the first encoder wheel;
    a first sensor configured to sense the first encoder wheel;
    a second sensor configured to sense the second encoder wheel;
    a controller communicatively connected to the first sensor and to the second sensor, wherein the controller is configured to determine the absolute angular position and the rotational direction on the basis of a binary signal, wherein the binary signal is derived from a first signal of the first sensor and a second signal of the second sensor.

2. The encoder as claimed in claim 1, wherein the teeth of the first encoder wheel or the teeth of the second encoder wheel have the same shape.

3. The encoder as claimed in claim 1, wherein the first sensor and the second sensor each comprise at least two sensor elements, and wherein the first signal and the second signal are each difference signals from measurement signals of the at least two sensor elements of the corresponding sensor.

4. The encoder as claimed in claim 1, wherein the first sensor and the second sensor are configured to each generate at least two first signals and at least two second signals.

5. The encoder as claimed in claim 4, wherein the controller is configured to determine the rotational direction on the basis of the at least two first signals or of the at least two second signals.

6. The encoder as claimed in claim 1, wherein the first sensor or the second sensor is a magnetic field sensor, and where accordingly the teeth of the first encoder wheel or the teeth of the second encoder wheel are ferromagnetic.

7. The encoder as claimed in claim 6, wherein the magnetic field sensor is a Hall sensor.

8. A vehicle comprising an encoder arrangement as claimed in claim 1.

9. A method for determining an absolute angular position and a rotational direction of a rotor, comprising the steps of:
    a) receiving a first signal from a first sensor that senses a first encoder wheel that is connected to the rotor so as to rotate with the rotor, wherein the first encoder wheel comprises a number n of evenly spaced teeth arranged along its circumference;
    b) receiving a second signal from a second sensor that senses a second encoder wheel that is connected to the first encoder wheel so as to rotate with the first encoder wheel, wherein the second encoder wheel comprises the same number n of teeth as the first encoder wheel along its circumference, wherein the teeth of the second encoder wheel have an asymmetric angular offset to the teeth of the first encoder wheel;
    c) deriving a binary signal from the first signal and the second signal;
    d) determining the absolute angular position on the basis of the binary signal; and
    e) determining the rotational direction on the basis of the binary signal.

10. The method as claimed in claim 9, wherein the first signal and the second signal are each difference signals of measurement signals from at least two sensor elements of the corresponding sensor.

11. The method as claimed in claim 9, wherein at least two first signals and at least two second signals are accordingly received in step a) and step b).

12. The method as claimed in claim 11, wherein the rotational direction is determined in step e) on the basis of the at least two first signals or of the at least two second signals.

13. The method as claimed in claim 9, wherein a determination of a starting angle is made on the basis of a test pulse method in step d).

14. A non-transitory machine-readable storage medium on which a computer program is stored which carries out the method of claim 9 when executed.

15. The method as claimed in claim 9, wherein a determination of a starting angle is made on the basis of a current pulse method in step d).

* * * * *